(12) United States Patent
Sawachi

(10) Patent No.: US 6,862,040 B1
(45) Date of Patent: Mar. 1, 2005

(54) DIGITAL STILL CAMERA AND METHOD OF CONTROLLING SAME

(75) Inventor: Youichi Sawachi, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 825 days.

(21) Appl. No.: 09/586,594

(22) Filed: Jun. 2, 2000

(30) Foreign Application Priority Data

Jun. 4, 1999 (JP) .......................................... 11-157374

(51) Int. Cl.⁷ .............................................. H04N 5/76
(52) U.S. Cl. ................. 348/231.3; 348/371; 348/231.7
(58) Field of Search .......................... 348/231.6, 231.3, 348/371, 231.7

(56) References Cited

U.S. PATENT DOCUMENTS

| | | | | |
|---|---|---|---|---|
| 5,845,044 A | * | 12/1998 | Iizuka et al. | 386/117 |
| 5,859,951 A | * | 1/1999 | Aihara et al. | 386/107 |
| 5,907,315 A | * | 5/1999 | Vlahos et al. | 382/167 |
| 6,630,950 B1 | * | 10/2003 | Ohkawara et al. | 348/208.12 |
| 2003/0133021 A1 | * | 7/2003 | Hamamura et al. | 348/229.1 |

* cited by examiner

Primary Examiner—Tuan Ho
Assistant Examiner—Heather R. Long
(74) Attorney, Agent, or Firm—Birch, Stewart, Kolasch & Birch, LLP

(57) ABSTRACT

The circuits of a digital still camera are configured in a comparatively simple manner. A settings memory card and an image-recording memory card are capable of being removably inserted into a digital still camera. Settings values for setting shooting conditions and processing methods to be applied to image data obtained by photography are recorded on the settings memory card, and image data is recorded on the image-recording memory card. Settings values that have been recorded on the settings memory card are read and the circuits of the camera are configured so as to afford shooting conditions and image processing methods decided by these settings values. A subject is imaged in accordance with the set shooting conditions and image processing is applied to the image data in accordance with the set image processing method. The image data that has been subjected to image processing is recorded on the image-recording memory card.

14 Claims, 9 Drawing Sheets

DIGITAL STILL CAMERA AND METHOD OF CONTROLLING SAME

BACKGROUND OF THE INVENTION

1. Field of the Invention

This invention relates to a digital still camera (inclusive of a portable image pick-up apparatus) and to a method of controlling the same.

2. Description of the Related Art

A digital still camera can be set to a variety of shooting conditions such as shutter speed, f-stop number and amount of strobe light emission. Further, a digital still camera can be set to various image processing methods regarding image data obtained by photography. For example, the settings that can be made include compression ratio, captured image size (numbers of pixels in horizontal and vertical directions), amount of white balance adjustment, image sharpness, image brightness, monochrome or color photography and volume of alert tones.

To set these shooting conditions or image processing methods, usually the mode of the digital still camera is made a mode for setting shooting conditions or image processing methods and the user sets the conditions or methods one at a time. In a case where a large number of shooting conditions or image processing methods are to be set, the setting operation can be a fairly laborious task. To a user who is not accustomed to making these settings, setting even one shooting condition or image processing method can be troublesome. Furthermore, it is very difficult for a user to remember the set conditions that were used previously and the current settings cannot be made the previous settings in a simple manner.

DISCLOSURE OF THE INVENTION

Accordingly, an object of the present invention is to provide a digital still camera in which shooting conditions and/or image processing methods can be set in a comparatively simple manner.

According to the present invention, the foregoing object is attained by providing a digital still camera in which a settings recording medium and an image-signal recording medium are capable of being removably loaded, wherein settings data for setting at least one of shooting conditions and image processing methods for processing an image signal (inclusive of both an analog video signal and digital image data) obtained by photography is recorded on the settings recording medium and an image signal obtained by photography is recorded on the image-signal recording medium, the digital still camera comprising: an image sensing device for imaging a subject and outputting an image signal representing the image of the subject; a settings data reading unit for reading the settings data that has been recorded on the settings recording medium; an imaging control unit (imaging control means) for controlling the image sensing device so as to image the subject according to shooting conditions that are based upon the settings data when the settings data that has been read by the settings data reading unit pertains to these shooting conditions; an image signal processing unit for applying image processing to an image signal, which is output from the image sensing device, by a processing method that is based upon the settings data when the settings data that has been read by the settings data reading unit pertains to this image processing method, and outputting the image signal that has been subjected to this image processing; and a first image-signal recording controller for recording the image signal, which has been output from the image signal processing unit, to the image-signal recording medium.

The present invention provides also a control method suited to the above-described camera. Specifically, the present invention provides a method of controlling a digital still camera in which a settings recording medium and an image-signal recording medium are capable of being removably loaded, wherein settings data for setting at least one of shooting conditions and image processing methods for processing an image signal obtained by photography is recorded on the settings recording medium and an image signal obtained by photography is recorded on the image-signal recording medium, the method comprising the steps of: imaging a subject and outputting an image signal representing the image of the subject; reading the settings data that has been recorded on the settings recording medium; imaging the subject according to shooting conditions that are based upon the settings data when the settings data that has been read pertains to these shooting conditions; applying image processing to an image signal, which has been obtained by photography, by a processing method that is based upon the settings data when the settings data that has been read pertains to this image processing method; and recording the image signal, which has been subjected to this image processing, on the image-signal recording medium.

In accordance with the present invention, two media, namely the settings recording medium and the image-signal recording medium, can be removably loaded in a digital still camera. The camera may be formed to have two sockets into which both media can be inserted simultaneously, or one socket into which the two media can be inserted in turns.

Settings data for setting shooting conditions and/or processing methods for processing an image signal obtained by photography is recorded on the settings recording medium. When the settings recording medium is loaded into the digital still camera, the settings data that has been recorded on this medium is read.

When settings data for setting shooting conditions has been recorded on the settings recording medium, the camera is controlled in such a manner that the shooting conditions to be used will conform to the settings data. When settings data for setting an image processing method has been recorded on the settings recording medium, the image signal obtained by photography when the subject is imaged is subjected to image processing by a processing method based upon the settings data that has been read from the settings recording medium. The image signal that has been subjected to such image processing is recorded on the image-signal recording medium.

In accordance with the present invention, the settings medium, on which has been recorded settings data for setting shooting conditions and/or image processing methods to be set by the user, is loaded into the digital still camera, whereby desired shooting conditions and/or image processing methods can be set. As a result, even a user who is not accustomed to operating a digital still camera can set shooting conditions and image processing methods in a comparatively simple manner.

An arrangement may be adopted in which it is determined whether the settings data is incapable of being read from the settings recording medium and, in response to a determination that the settings data cannot be read, imaging of the subject based upon predetermined shooting conditions, and image processing of the image signal, which has been obtained by image sensing, in accordance with a predetermined image processing method, are carried out.

Thus, even if settings data cannot be read from the recording medium that is for setting the image processing conditions, predetermined shooting conditions and a predetermined image processing method can be set.

Data representing shooting conditions already put into practice and data representing a processing method executed in regard to an image signal obtained by imaging may be stored. In such case it is determined whether the settings data is incapable of being read and, in response to a determination that the settings data cannot be read, imaging of the subject based upon immediately preceding shooting conditions that have been stored, and image processing of the image signal, which is output from the image sensing device, in accordance with an image processing method that is based upon data representing the immediately preceding processing method, are carried out.

Thus, imaging of the subject based upon shooting conditions identical with those used in preceding photography can be performed and image processing can be executed by the image processing method that was used in the previous photography.

The digital still camera may further include a loading sensing unit for sensing that the settings recording medium has been loaded. In such case the settings data that has been recorded on the settings recording medium is read in response to sensing by the sensing unit of the fact that the settings recording medium has been loaded.

It may be arranged so that a reset command can be input to the camera. In such case the settings data that has been recorded on the settings recording medium is read in response to input of the reset command.

An arrangement may be adopted in which an image signal that has been obtained by photography in accordance with shooting conditions and an image signal that has been subjected to image processing are recorded on the settings recording medium. By reading the image signals that have been recorded on the settings recording medium, it is possible to check the image that will be obtained by photography based upon the shooting conditions and the processed image that will be obtained by this image processing.

An arrangement may be adopted in which a reduced image of an image represented by an image signal obtained by photography in accordance with the shooting conditions and a reduced image of an image represented by an image signal that has been subjected to image processing are generated and signals representing the generated reduced images are recorded on the settings recording medium.

Thus, image signals of reduced quantity are recorded on the settings recording medium. As a result, image signals can be recorded efficiently even if the settings recording medium is of small capacity.

Thus, as described above, an image signal representing an image is recorded on the settings recording medium. As a result, when the image signal is read, the image represented by the read image signal can be displayed on a display unit.

Settings data representing shooting conditions of a plurality of types or image processing methods of a plurality of types may be recorded on the settings recording medium. In such case the shooting conditions or image processing methods of the plurality of types represented by the read settings data are displayed on the display unit and a desired shooting condition or processing method is selected from the shooting conditions or image processing methods of the plurality of types displayed on the display unit. Imaging is performed based upon the selected shooting condition and image signal processing is executed in accordance with the selected processing method.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
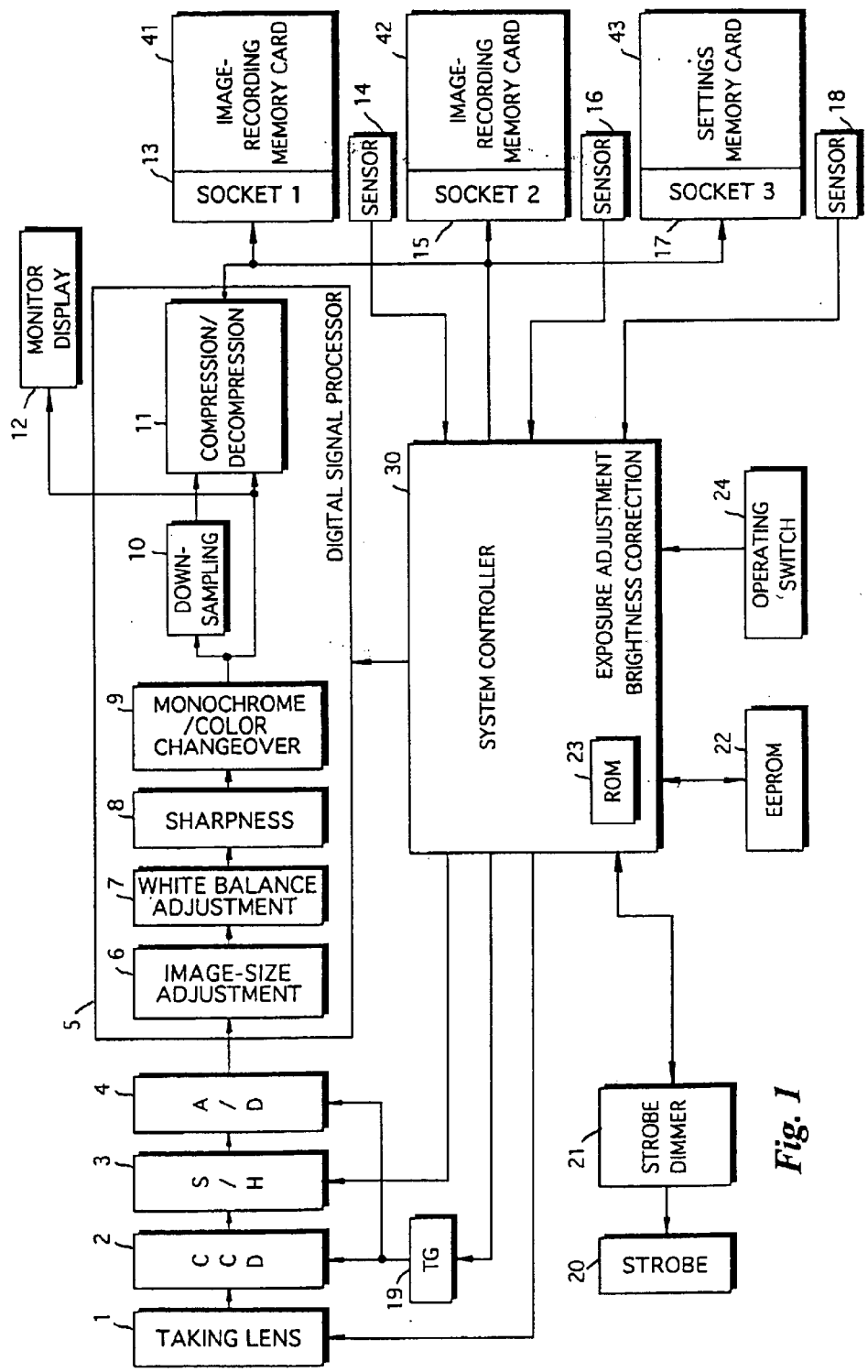
FIG. 1 is a block diagram illustrating the electrical construction of a digital still camera according to an embodiment of the present invention.

FIG. 1 is a block diagram illustrating the electrical construction of a digital still camera according to the embodiment of the present invention.

The overall operation of the digital still camera is controlled by a system controller 30.

A first image-recording memory card 41, a second image-recording memory card 42 and a settings memory card 43 are capable of being inserted into the digital still camera. The first image-recording memory card 41 and second image-recording memory card 42 are memory cards for recording image data obtained by imaging a subject. The settings memory card 43 is a memory card on which is recorded data representing settings values for setting shooting conditions and image processing methods for each of the circuits constituting the digital still camera, as will be described later. The shooting conditions and image processing methods of the circuits constituting the digital still camera are set based upon the settings values stored on the settings memory card 43.

The digital still camera includes a first socket 13, a second socket 15 and a third socket 17. The first image-recording memory card 41 is inserted into the first socket 13 and the second image-recording memory card 42 is inserted into the second socket 15. The settings memory card 43 is inserted into the third socket 17. The digital still camera is provided with a sensing circuit 14 for sensing that the first image-recording memory card 41 has been inserted into the first socket 13 and for inputting the resulting detection signal to the system controller 30, and with a sensing circuit 16 for sensing that the second image-recording memory card 42 has been inserted into the second socket 15 and for inputting the resulting detection signal to the system controller 30. The camera is further provided with sensing circuit 18 for sensing that the settings memory card 43 has been inserted into the third socket 17 and for inputting the resulting detection signal to the system controller 30.

The digital still camera is further provided with an operating switch 24 for applying various commands. Signals representing operating commands from the operating switch 24 are input to the system controller 30.

The system controller 30 is provided with an internal ROM 23 in which data representing initially set values of shooting conditions and image processing methods has been stored. The system controller 30 is further provided with an externally mounted EEPROM 22. The EEPROM 22 stores data representing shooting conditions and image processing methods that were used in the immediately preceding imaging operation.

The digital still camera is capable of strobe photography and therefore is provided with a strobe emission unit 20 and a strobe dimmer unit 21 for adjusting the amount of light emitted by the strobe emission unit 20. The strobe dimmer unit 21 is controlled by the system controller 30, thereby adjusting the amount of quantity of light emitted.

The image of a subject is formed on the photoreceptor surface of a CCD 2 by a taking lens 1. The CCD 2 has its shutter speed controlled by a timing generator 19. (This is an exposure control function, or so-called electronic shutter.) The CCD 2 outputs a color video signal representing the image of the subject. This signal enters an analog/digital conversion circuit 4 via a sample-and-hold circuit 3. The analog/digital conversion circuit 4 converts the analog video signal to digital image data, which is then input to a digital signal processing circuit 5.

The digital image data that has been applied to the digital signal processing circuit 5 is applied to an image-size adjustment circuit 6. The digital image data has its image size (numbers of pixels in the horizontal and vertical directions) adjusted by the image-size adjustment circuit 6. Image data output from the image-size adjustment circuit 6 is subjected to a white balance adjustment in a white balance adjustment circuit 7. The image data that has undergone the white balance adjustment is subjected to sharpness processing (contour emphasis processing, etc.) in a sharpness circuit 8. Image data output from the sharpness circuit 8 is applied to a monochrome/color adjustment circuit 9 which, in dependence upon the settings, outputs entered color image data unchanged as image data or converts this color image data to image data (luminance data) representing a black-and-white image.

Image data output from the monochrome/color adjustment circuit 9 is input to a monitor display unit 12. An image represented by image data obtained by imaging a subject is displayed on the monitor display unit 12.

The image data output from the monochrome/color adjustment circuit 9 is input to a downsampling circuit 10 as well. The latter generates data expressing a thumbnail image of a sensed image represented by image data obtained by imaging. The generated thumbnail image data is input to a compression/decompression circuit 11, to which the image data output from the monochrome/color adjustment circuit 9 is applied as well. The compression/decompression circuit 11 subjects the sensed-image data and the thumbnail image data to compression processing. The sensed-image data and the thumbnail image data that has been compressed is recorded on the first image-recording memory card 41 or second image-recording memory card 42. Of course, an arrangement may be adopted in which the compressed data is recorded on both the first image-recording memory card 41 and second image-recording memory card 42.

The digital still camera is capable of reproducing images as well. If compressed image data that has been recorded on the first image-recording memory card 41 or second image-recording memory card 42 is read, the compressed image data is applied to the compression/decompression circuit 11, where the data is subjected to data decompression. By applying the decompressed image data to the monitor display unit 12, the image represented by the image data recorded on the first image-recording memory card 41 or second image-recording memory card 42 is displayed on the display screen of the monitor display unit 12.

Figure 2:
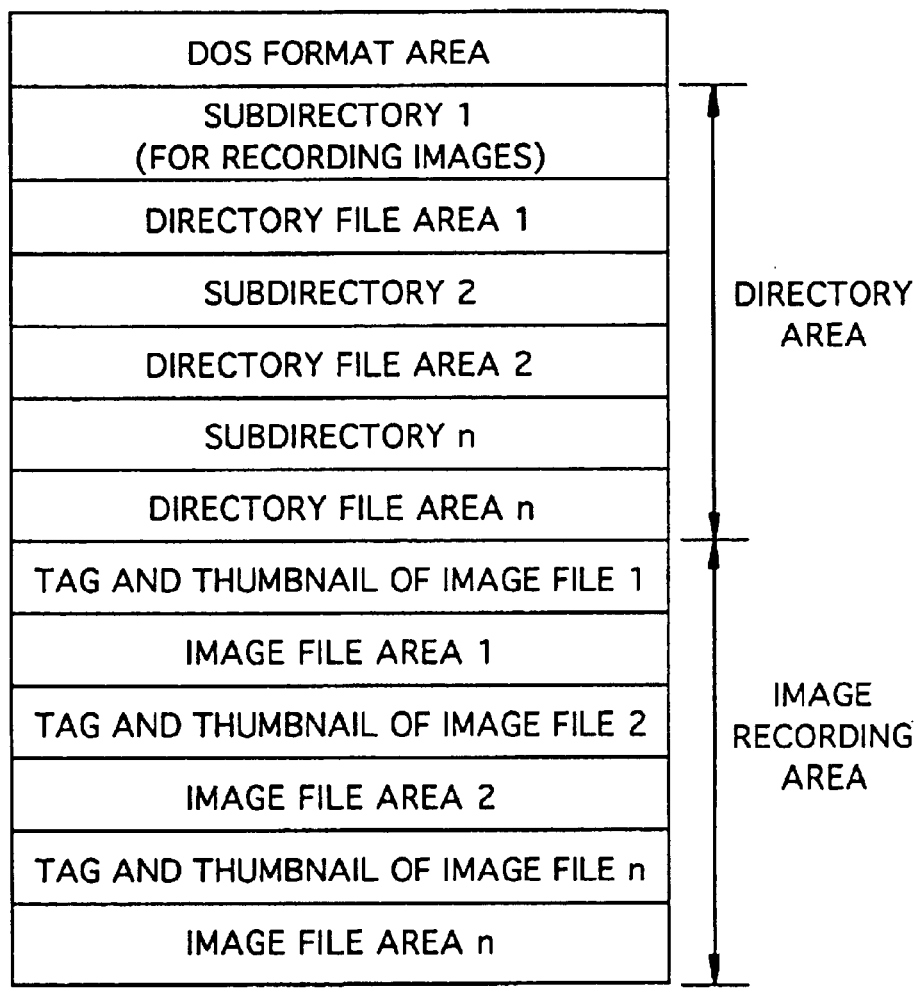
FIG. 2 is a diagram illustrating the file structure of a memory card for recording images.

FIG. 2 illustrates the file structure of the first image-recording memory card 41. The file structure of the second image-recording memory card 42 is the same as that of the first image-recording memory card 41.

The first image-recording memory card 41 has a recording area that includes a DOS (Disk Operating System) format area, a directory area and a image recording area.

Data indicating the fact that the first image-recording memory card 41 is DOS-formatted is recorded in the DOS format area.

Various data other than image data is recorded in the directory area. The directory area includes a plurality of subdirectory areas and directory file areas. Data indicating that this memory card 41 is an image-recording memory card is recorded in a subdirectory 1. The other subdirectories are blank. The paths to image data that has been recorded in the image recording area are recorded in the directory file areas. Image-file tags [data representing compression ratios of images represented by image data that has been recorded in image file areas, described later, shutter-speed used when these images were captured, ISO (International Standards Organization) sensitivities etc.] and image data representing thumbnail images are recorded in the image recording area.

Figure 3:
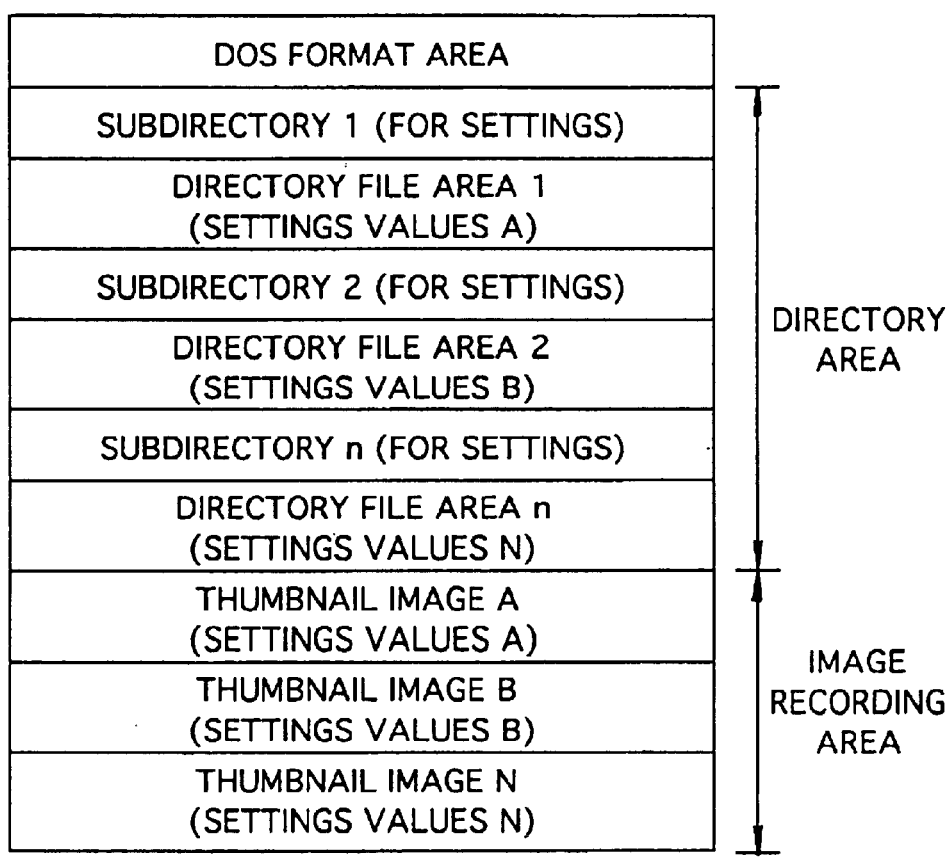
FIG. 3 is a diagram illustrating the file structure of a settings memory card.

FIG. 3 illustrates the file structure of the settings memory card 43.

The settings memory card 43 includes a DOS format area, directory area and image recording area in a manner the same as that of the first image-recording memory card 41.

Data indicating that this card is the settings memory card is recorded in a subdirectory 1 of the directory area. Combinations of data representing shooting conditions and image processing methods are recorded in the directory file areas. For example, settings values (which shall be referred to as "settings values A") are recorded in directory file area 1 (where 1 represents the file number) as a combination of a set value for image size adjustment, a set value for white balance adjustment and a set value for sharpness. Settings values are recorded in the other directory file areas in the form of other combinations.

Image data representing thumbnail images is recorded in the image recording area. Thumbnail image data of image data, which has been obtained by subjecting image data resulting from imaging to image processing by an image processing method based upon the settings values "A", is recorded in the recording area of a thumbnail image "A". Similarly, thumbnail image data of image data obtained by imaging in accordance with shooting conditions and by image processing in accordance with image processing methods based upon corresponding settings values are recorded in the recording areas of the other thumbnail images.

Figure 4:
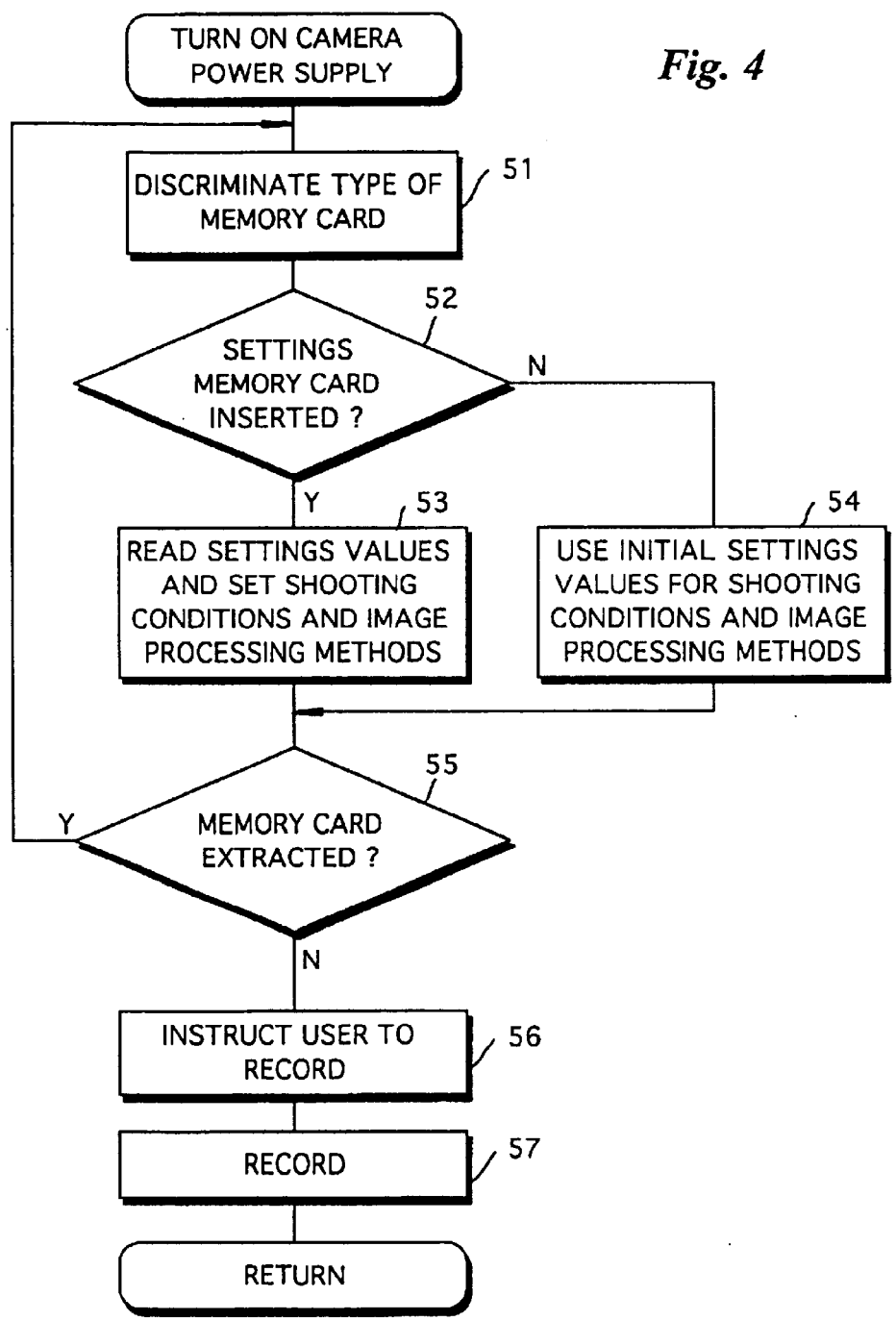
FIG. 4 is a flowchart illustrating processing up to the setting of shooting conditions and image processing methods.

FIG. 4 is a flowchart showing processing executed when setting of the various circuits of the digital still camera is performed based upon settings values that have been recorded on the settings memory card 43.

Processing starts when a power switch (not shown) on the digital still camera is turned on. First, on the basis of the data that has been recorded in the subdirectories of the memory cards, it is determined whether a memory card that has been inserted into the digital still camera is an image-recording memory card or a settings memory card (step 51).

If it is found that the settings memory card 43 has been inserted into the digital still camera ("YES" at step 52), then settings values that have been recorded on the inserted settings memory card 43 are read [here it is assumed that only a single set (type) of settings values, namely settings values "A", has been recorded on the settings memory card 43] (step 53). On the basis of the settings values "A" read, shooting conditions and image processing methods (adjustment of amount of strobe light emission, shutter-speed adjustment, image-size adjustment, white balance adjustment, sharpness adjustment, monochrome/color adjustment, compression-ratio adjustment, adjustment of amount of brightness correction, setting of photometry to spot photometry or average photometry, etc.) are set for each of the circuits of the digital still camera in such a manner that the subject will be imaged and the image data obtained by such imaging of the subject will be subjected to image processing.

If it is found that the settings memory card 43 has not been inserted into the digital still camera ("NO" at step 52), then the shooting conditions and image processing methods for configuring the circuits of the digital still camera are set based upon an initial image processing method that has been stored in the ROM 33 (step 54). Of course, an arrangement may be adopted in which each circuit of the digital still camera is configured to shooting conditions and image processing methods the same as those of the immediately preceding imaging operation stored in the EEPROM 22.

Whether a memory card has been extracted from the digital still camera is verified based upon detection signals from the sensing circuits 14, 16 and 18 (step 55). If a memory card has not been extracted, an instruction prompting the user to perform recording is displayed on the monitor display unit 12 (step 56). If the user responds by pressing a shutter-release button (not shown), the sensed-image data is recorded on the image-recording memory card 41 or 42 in the manner described above (step 57).

Figure 5:
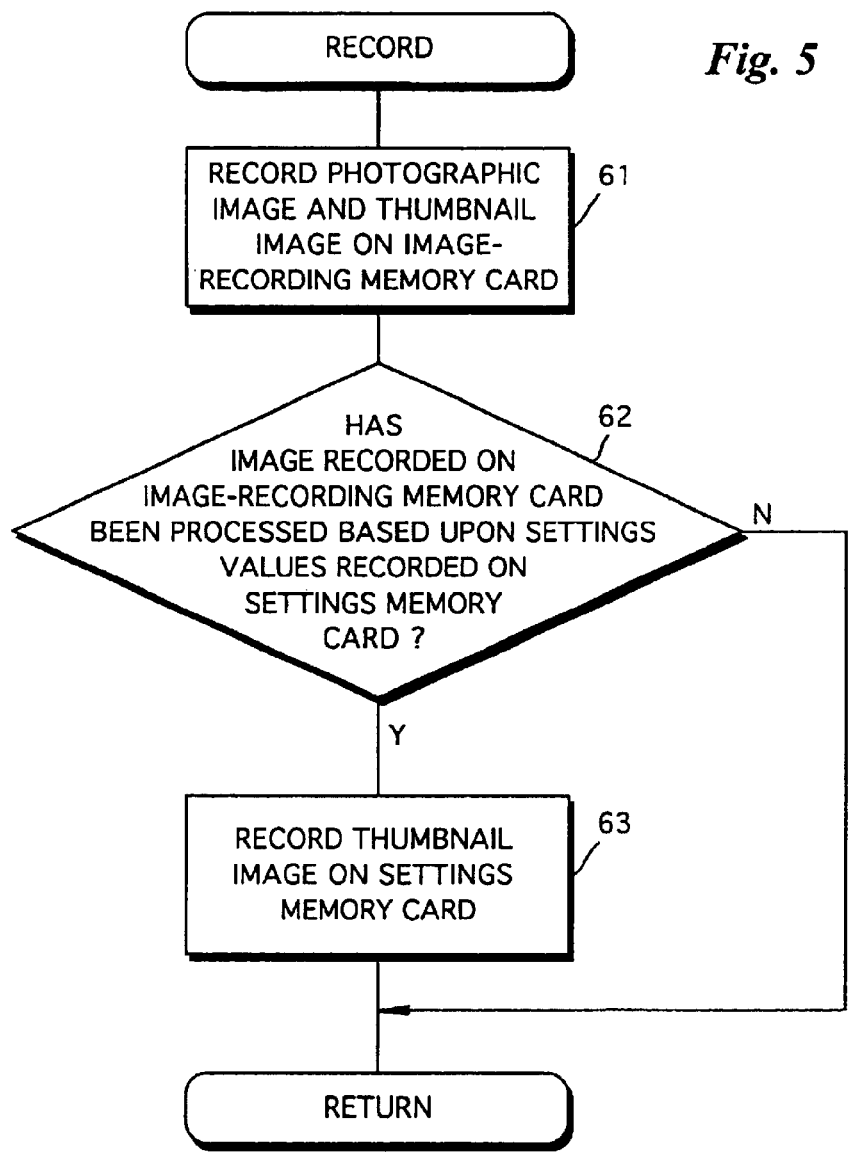
FIG. 5 is a flowchart illustrating processing for recording image data.

FIG. 5 is a flowchart illustrating processing for recording image data.

When a recording prompt is displayed on the monitor display unit 12 in the manner described above, the user presses the shutter-release button. When this is done, the sensed-image data representing the image of the subject and the thumbnail image data is applied to the first image-recording memory card 41 and stored in the image recording area (step 61).

If the image data recorded on the first image-recording recording memory card 41 is image data for which shooting conditions and image processing methods have been set based upon settings values recorded on the settings memory card 43 ("YES" at step 62), then thumbnail image data identical with thumbnail image data recorded on the first image-recording memory card 41 is recorded, in association with the settings values of the image processing methods, in the image recording area of the settings memory card 43 (step 63). An arrangement may be adopted in which thumbnail image data that has been recorded on the first image-recording memory card 41 is read out and then stored on the settings memory card 43, or in which the digital still camera is provided with an image memory, thumbnail image data is stored in this image memory temporarily and thumbnail image data read out of the image memory is recorded on the settings memory card 43.

Figure 6:
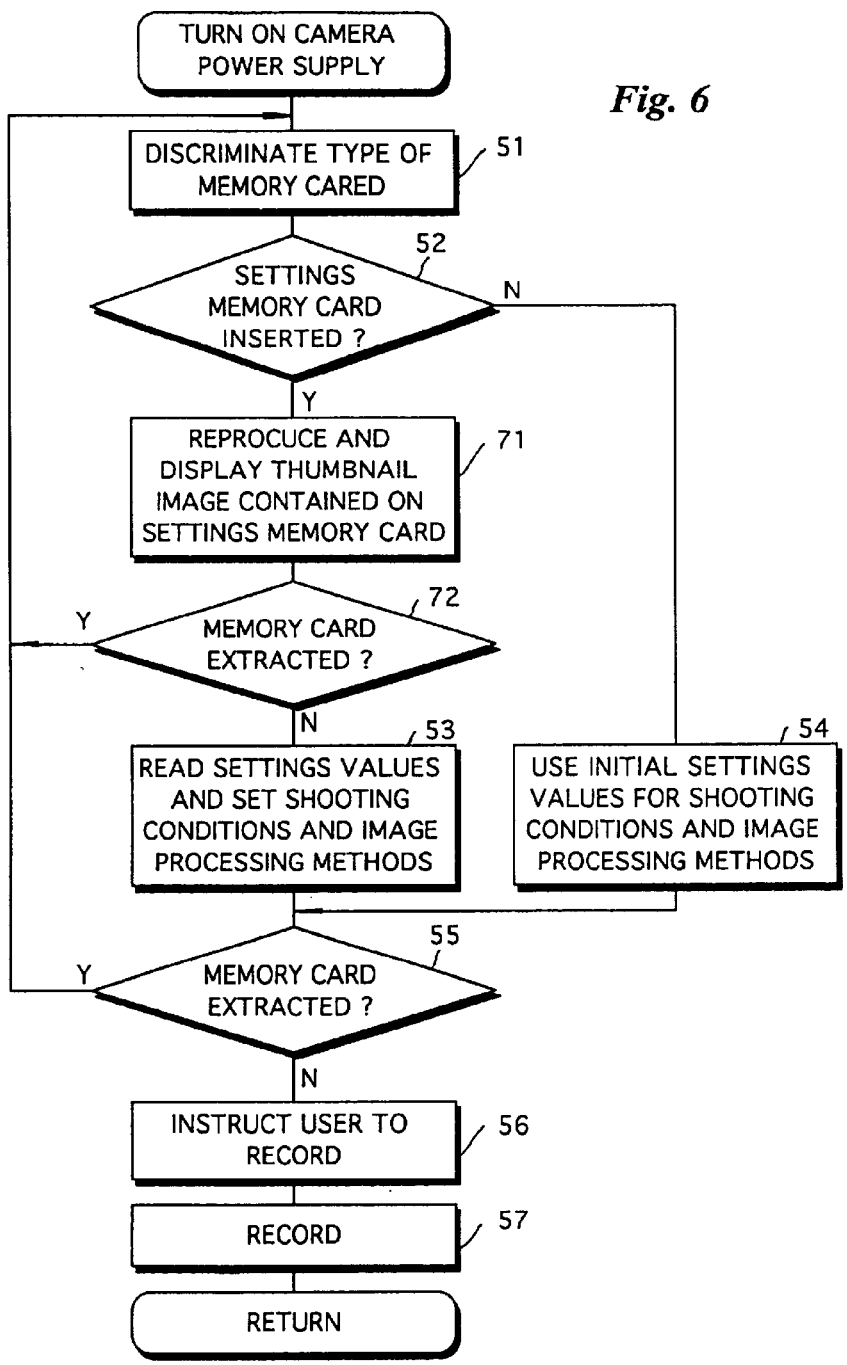
FIGS. 6 to 9 are flowcharts illustrating processing up to the setting of shooting conditions and image processing methods.

FIG. 6 is a flowchart illustrating processing executed when setting the circuits of the digital still camera based upon settings values recorded on the settings memory card 43 on which thumbnail image data has been recorded. Processing steps in FIG. 6 identical with those shown in FIG. 4 are designated by like step numbers and need not be described again.

If the settings memory card 43 has been inserted into the digital still camera ("YES" at step 52), compressed thumbnail image data that has been recorded on the settings memory card 43 is read out. The compressed thumbnail image is applied to the compression/decompression circuit 11 and is decompressed thereby. The decompressed thumbnail image data is applied to the monitor display unit 12, whereby the thumbnail image represented by the thumbnail image data recorded on the settings memory card 43 is displayed (step 71). The thumbnail image being displayed on the monitor display unit 12 is the result of imaging according to shooting conditions decided by the settings values corresponding to this thumbnail image and of image processing in accordance with the image processing method. Thus, it is possible to check the appearance of the image obtained in a case where imaging has been performed according to the shooting conditions and image processing has been executed according to the image processing method.

If it is found that the memory card has not been extracted from the digital still camera ("NO" at step 72), the settings values that have been recorded on the settings memory card 43 are read and the shooting conditions and image processing methods associated with the circuits of the digital still camera are adjusted based upon these settings values (step 53).

Figure 7:
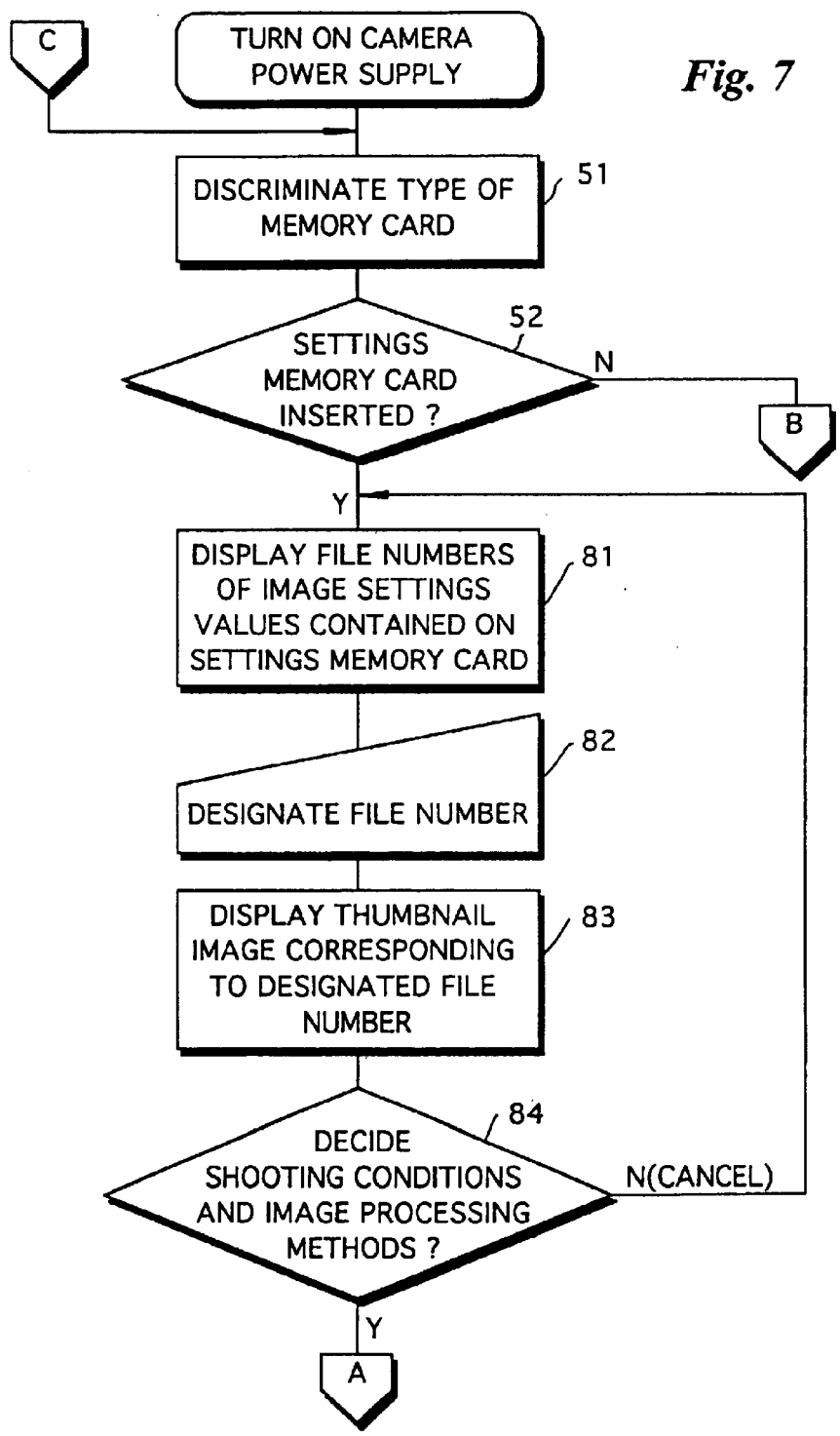

FIG. 7 is a flowchart illustrating processing when setting the circuits of the digital still camera based upon settings values recorded on the settings memory card 43. Processing steps in FIG. 7 identical with those shown in FIG. 4 are designated by like step numbers and need not be described again. It is assumed in this processing that plural sets of settings values have been recorded on the settings memory card 43.

If the settings memory card 43 has been inserted into the digital still camera ("YES" at step 52), data representing the file numbers of the directory areas of settings memory card 43 is read out of the settings memory card 43. The read data representing the file numbers is applied to the monitor display unit 12, whereby a plurality of file numbers are displayed (step 81). The user employs the operating switch 24 to designate a desired file number from among the plurality of file numbers displayed on the monitor display unit 12 (step 82).

Thumbnail image data corresponding to the settings values recorded in the file area specified by the designated file number is read out of the image recording area of the settings memory card 43. The thumbnail image data read out is decompressed in the compression/decompression circuit 11 and then displayed on the monitor display unit 12 (step 83).

If a decision command is applied from the operating switch 24 ("YES" at step 84), settings values for specifying the image processing methods and shooting conditions that were used with regard to the decided thumbnail image are read out of the settings memory card 43. The circuits of the digital still camera are configured based upon the settings values read out.

If the memory card has been extracted from the digital still camera ("YES" at step 55), then processing from step 51 onward is repeated.

Figure 8:
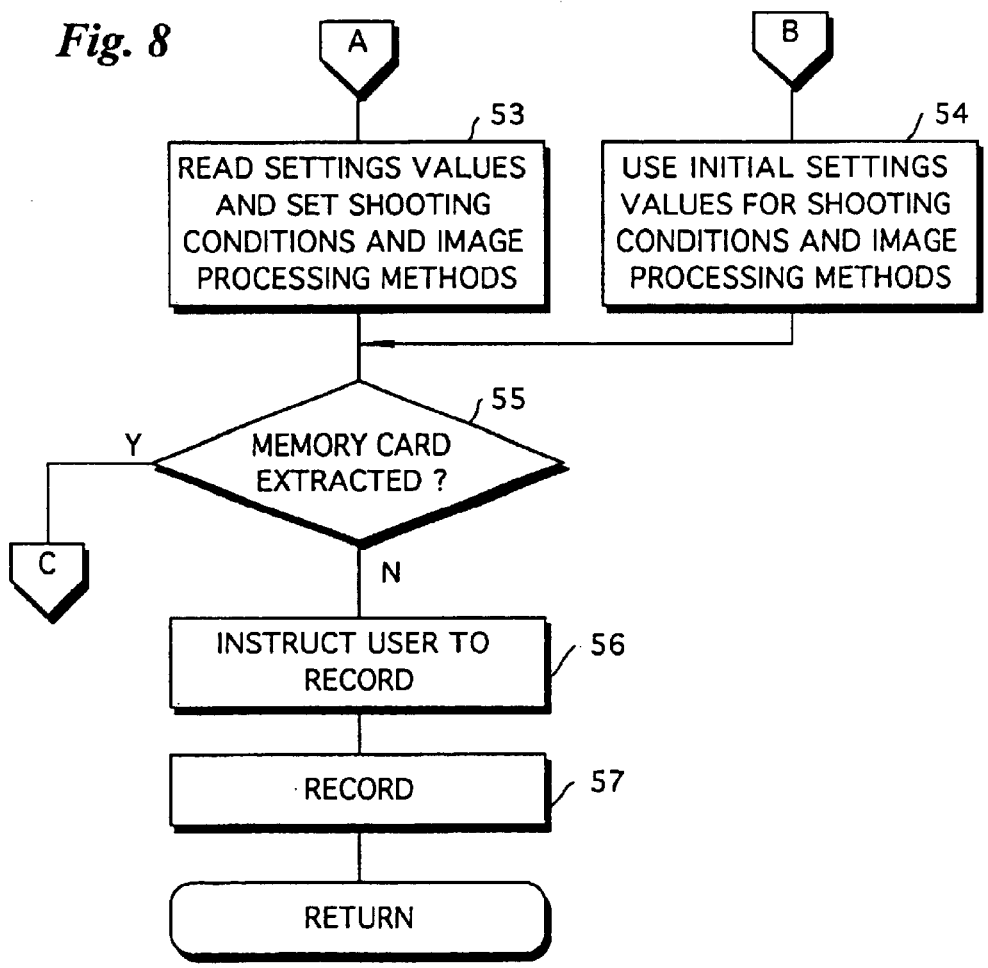
Figure 9:
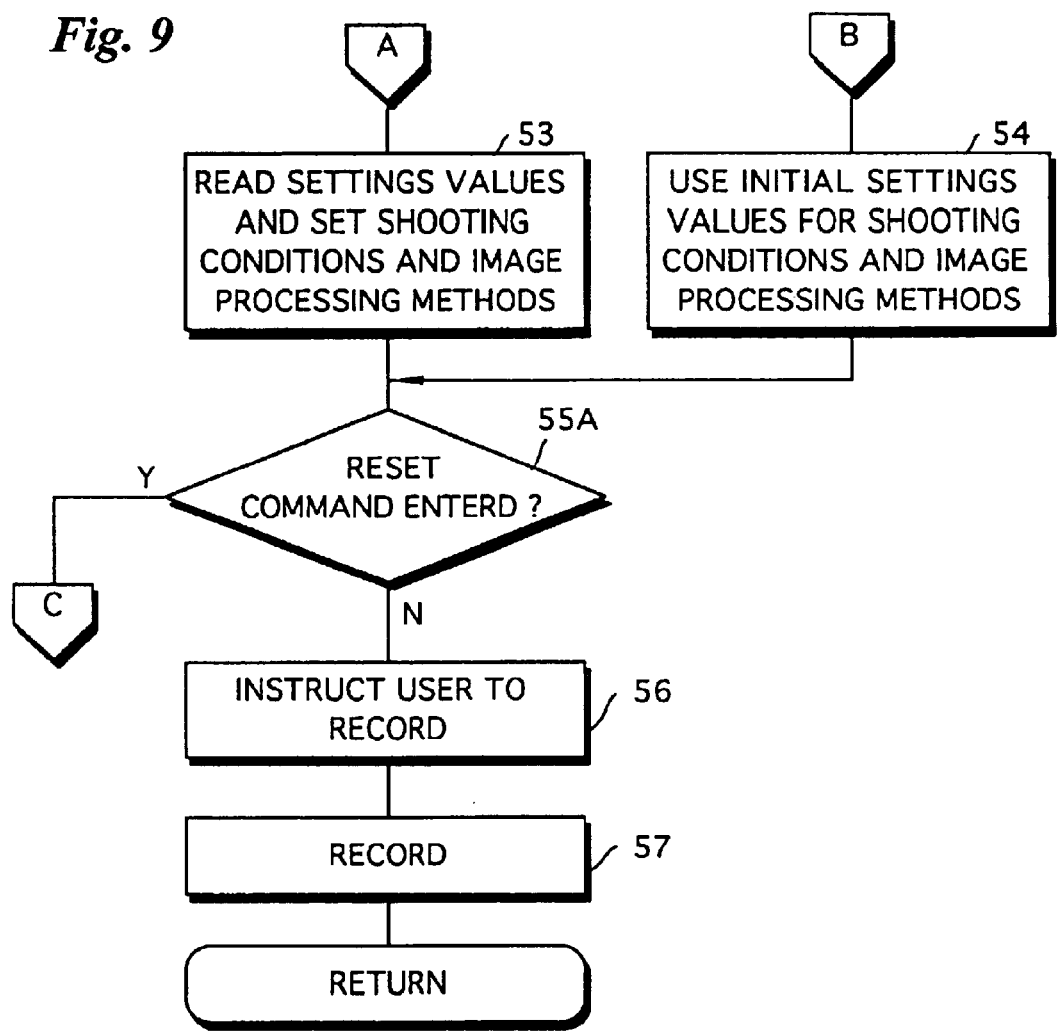

FIG. 9 is a flowchart illustrating part of the processing executed when setting the circuits of the digital still camera based upon settings values recorded on the settings memory card 43. This flowchart corresponds to the processing of FIG. 8 and processing steps in FIG. 8 identical with those shown in FIG. 8 are designated by like step numbers and need not be described again.

The processing shown in FIG. 8 is such that if the memory card has been extracted ("YES" at step 55), processing from step 51 onward is repeated. By contrast, in the processing of FIG. 9, processing from step 51 onward is repeated in response to entry of a reset command (which would be input by the operating switch 24) ("YES" at step 55A).

In a case where the image-recording memory card 41 and settings memory card 43 can be inserted simultaneously, as shown in FIG. 1, extraction of a memory card can be construed to mean a change in shooting conditions. The processing shown in FIGS. 7 and 8 is applicable to such case. The processing shown in FIG. 9 is applicable in a case where there is only one socket for inserting a memory card and either the image-recording memory card 41 or settings memory card 43 is inserted into the digital still camera. If, in a case where only the image-recording memory card 41 or settings memory card 43 can be inserted into the digital still camera, the settings values are read from the settings memory card 43 to decide the shooting conditions and image processing methods and then image data is to be recorded on the image-recording memory card 41, it is necessary to extract the settings memory card 43 from the digital still camera. In such case the processing of FIG. 9 is required because extracting the memory card would result in a problem when processing from step 51 onward is re-executed.

As many apparently widely different embodiments of the present invention can be made without departing from the spirit and scope thereof, it is to be understood that the invention is not limited to the specific embodiments thereof except as defined in the appended claims.

What is claimed is:

1. A digital still camera in which a settings recording medium and an image-signal recording medium are capable of being removably loaded, wherein settings data for setting at least one of shooting conditions and image processing methods for processing an image signal obtained by photography is recorded on the settings recording medium and the image signal obtained by photography is recorded on the image-signal recording medium, said digital still camera comprising:

an image sensing device for imaging a subject and outputting an image signal representing the image of the subject;

a settings data reading unit for reading the settings data that has been recorded on the settings recording medium;

an imaging control unit for controlling said image sensing device so as to image the subject in accordance with shooting conditions that are based upon the settings data when the settings data that has been read by said settings data reading unit pertains to these shooting conditions;

a determination unit for determining whether the settings data is incapable of being read by said settings-data reading unit;

an image signal processing unit for applying image processing to an image signal, which is output from said image sensing device, in accordance with a processing method that is based upon the settings data when the settings data that has been read by said settings data reading unit pertains to this image processing method, for applying image processing of the image signal, which is output from said image sensing device, in accordance with a predetermined processing method, in response to a determination by said determination unit that the settings data cannot be read, and outputting the image signal that has been subjected to this image processing; and a first image-signal recording controller for recording the image signal, which has been output from said image signal processing unit, on the image-signal signal recording medium.

2. The digital still camera according to claim 1, further comprising:

a processing-method-data storage unit for storing data representing a processing method that has been executed by said image signal processing unit;

wherein in response to a determination by said determination unit that the settings data cannot be read, said image signal processing unit executes image processing of the image signal, which is output from said image sensing device, in accordance with a processing method that is based upon data, which represents an immediately preceding processing method, stored in said processing-method-data storage unit.

3. The digital still camera according to claim 1, further comprising:

a shooting-condition storage unit for storing shooting conditions that were put into practice by said imaging control unit;

wherein in response to a determination by said determination unit that the settings data cannot be read, said imaging controller controls said image sensing device in accordance with immediately preceding shooting conditions that have been stored in said shooting-condition storage unit.

4. The digital still camera according to claim 1, further comprising a loading sensing unit for sensing that the settings recording medium has been loaded;

wherein in response to sensing by said loading sensing unit of the fact that the settings recording medium has been loaded, said settings data reading unit reads data that has been recorded on the settings recording medium.

5. The digital still camera according to claim 1, further comprising a reset-command input unit;

wherein in response to entry of a reset command from said reset-command input unit, said settings data reading unit reads settings data that has been recorded on the settings recording medium.

6. The digital still camera according to claim 1, further comprising:

a first socket for loading the settings recording medium; and a second socket for loading the image-signal recording medium.

7. The digital still camera according to claim 1, further comprising a second image-signal recording controller for recording the image signal, which has been output from said image signal processing unit, on the settings recording medium.

8. The digital still camera according to claim 1, further comprising:
   a reduced-image generating unit for generating a reduced image of an image represented by the image signal output from said image signal processing unit; and
   a second image-signal recording controller for recording a signal representing a reduced image generated by said reduced-image generating unit on the settings recording medium.

9. The digital still camera according to claim 1, further comprising:
   an image signal reading unit for reading an image signal that has been recorded on the image-signal recording medium; and
   a display controller for exercising control in such a manner that an image represented by the image signal read by said image signal reading unit is displayed on a display unit.

10. The digital still camera according to claim 1, wherein settings data representing image processing methods of a plurality of types are recorded on the settings recording medium; said camera further comprising:
   a processing-method display controller for exercising control in such a manner that image processing methods of a plurality of types represented by settings data read by said settings data reading unit are displayed on a display unit; and
   a processing-method selection unit for selecting a desired processing method from among the processing methods of the plurality of types displayed on the display unit;
   said image signal processing unit executes image signal processing in accordance with a processing method that has been selected by said processing-method selection unit.

11. The digital still camera according to claim 1, further comprising:
   a recording controller for recording an image signal, which has been processed in accordance with a processing method selected by said processing-method selection unit, on said image-signal recording medium;
   an image signal reading unit for reading an image signal recorded by said recording controller from said image-signal recording medium; and
   an image display controller for displaying, on a display unit, an image represented by the image signal that has been read by said image signal reading unit.

12. The digital still camera according to claim 1, wherein settings data representing shooting conditions of a plurality of types are recorded on the settings recording medium; said camera further comprising:
   a shooting-condition display controller for exercising control in such a manner that shooting conditions of a plurality of types represented by settings data read by said settings data reading unit are displayed on a display unit; and
   a shooting-condition selection unit for selecting a desired shooting condition from among the shooting conditions of the plurality of types displayed on the display unit;
   said imaging control unit controls said image sensing device in accordance with a shooting condition that has been selected by said operating-condition selection unit.

13. The digital still camera according to claim 12, further comprising:
   a recording controller for recording, on the image-signal recording medium, an image signal captured in accordance with a shooting condition that has been selected by said shooting-condition selection unit; and
   an image signal reading unit for reading, from the image-signal recording medium, and an image represented by the image signal that has been read by said image signal reading unit.

14. A method of controlling a digital still camera in which a settings recording medium and an image-signal recording medium are capable of being removably loaded, wherein settings data for setting at least one of shooting conditions and image processing methods for processing the image signal obtained by photography is recorded on the settings recording medium and an image signal obtained by photography is recorded on the image-signal recording medium, said method comprising the steps of:
   imaging a subject and outputting an image signal representing the image of the subject;
   reading the settings data that has been recorded on the settings recording medium with a settings data reading unit;
   when the settings data that has been read pertains to shooting conditions, imaging the subject in accordance with shooting conditions that are based upon this settings data;
   when the settings data that has been read pertains to an image processing method, applying image processing to an image signal, which has been obtained by photography, in accordance with a processing method that is based upon this settings data;
   determining with a determination unit whether the settings data is incapable of being read by said settings data reading unit and applying image processing of the image signal which is output from said image sensing device in accordance with a predetermined processing method, in response to a determination by the determination unit that the settings data cannot be read; and
   recording the image signal, which has been subjected to this image processing, on the image-signal recording medium.

* * * * *